March 29, 1927.                                         1,622,969
R. W. PAGE
COVERING OF PLASTIC MATERIAL AND METHOD OF MAKING THE SAME
Filed April 6, 1926         2 Sheets-Sheet 1

INVENTOR
Robert W. Page
BY
his ATTORNEY

March 29, 1927.

R. W. PAGE 1,622,969

COVERING OF PLASTIC MATERIAL AND METHOD OF MAKING THE SAME

Filed April 6 1926     2 Sheets-Sheet 2

INVENTOR
Robert W. Page
BY
his ATTORNEY

Patented Mar. 29, 1927.

1,622,969

UNITED STATES PATENT OFFICE.

ROBERT W. PAGE, OF GLEN RIDGE, NEW JERSEY.

COVERING OF PLASTIC MATERIAL AND METHOD OF MAKING THE SAME.

Application filed April 6, 1926. Serial No. 100,032.

This invention relates to coverings, or surfacing layers, made of plastic material, for floors, walls and other objects, and to methods of making the same. The invention has been made especially with the idea of securing ornamental effects in terrazzo and similar concrete flooring.

So-called terrazzo flooring is made by laying on a suitable foundation, a covering or layer of suitable thickness of a plastic concrete mixture consisting of an aggregate of small chips or pieces of marble or other stone mixed with a suitable cementitious or bonding material such as Portland cement or magnesium oxy-chloride, or magnesia, cement, the plastic mass being leveled off and allowed to harden, and thereafter ground to obtain a smooth and finished surface in which the stone pieces are exposed. Contrasting color effects in such terrazzo flooring have heretofore been obtained in straight lines or geometrical patterns by laying concrete of different colors separated by either temporary or permanent dividing strips. The floors are laid in tile effect, for example, with rectangular portions, which may be of more or less varying colors, marked off by brass strips placed in position before the plastic mass is spread on the floor. In such methods of obtaining contrasting color effects in floors made of terrazzo concrete or other plastic material, however, the covering is laid in a set pattern and the division lines between adjacent areas of contrasting appearance are sharply and definitely marked.

The object of the present invention is to obtain in plastic coverings, especially plastic floorings, decorative effects or appearances which are not confined to sharply defined set designs, but rather to produce contrasting effects of more or less irregular, but controlled, design, resembling for example, the veining or mottling of natural stone such as marble, travertine, etc., and with the areas of contrasting appearance not sharply defined but rather indefinite in outline with the stone particles or pieces of the material on adjacent surface areas being more or less intermingled along the indefinite line of juncture of the areas.

According to my invention, a body layer of a plastic concrete mixture containing cement and an aggregate of small pieces of stone is laid and leveled off in the usual manner. A plastic mixture of cement and stone pieces which is of different appearance from the mixture of the body layer is then laid on portions of the body layer in distributed lines or areas according to a desired plan or design to be produced, channels or other openings to receive the applied mixture having, most desirably, been formed in the body layer. Then while the body layer and the applied mixture are still in a plastic state, the layer is rolled or tamped to press the applied mixture into the body layer and consolidate it with the body layer, and then after the whole mass has been allowed to harden, the surface is ground smooth in the usual way to give a smooth finish and expose the pieces of the stone aggregates. There is thus produced a covering or surfacing layer comprising a body layer of concrete containing an aggregate of small stone pieces and having a smooth surface with distributed areas of contrasting color or otherwise differing in appearance from the surface of the body layer and also formed by a plastic mixture of cement and small stone pieces pressed into the body layer and forming therewith an integral mass, the areas of contrasting appearance being of varying size and shape as desired and more or less indefinite, or not sharply defined, in outline and arranged to produce a desired decorative effect.

In the accompanying drawings:—

Figure 1:
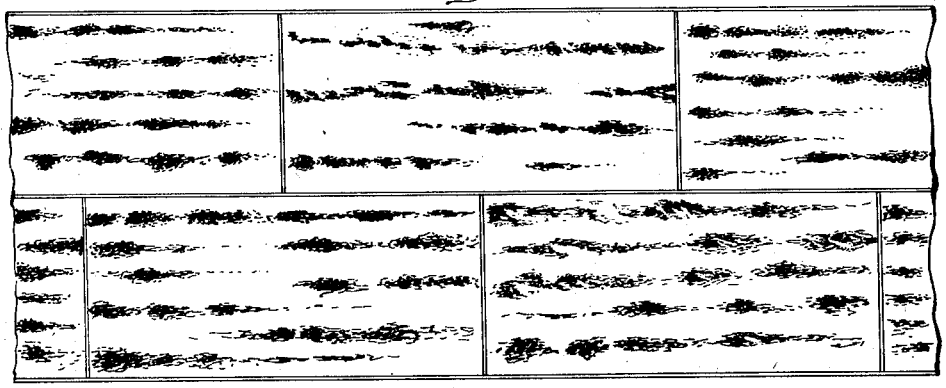
Fig. 1 shows a portion of a terrazzo floor according to my invention resembling somewhat a flooring of natural travertine.

Referring to the drawings, Fig. 1 shows somewhat suggestively a flooring with a design in imitation of natural travertine, made of plastic concrete material laid in tile effect with rectangular portions marked off and separated by brass or other dividing strips in the customary manner of laying terrazzo flooring in tile effect. The flooring with this design or decorative effect or appearance is shown merely as an illustrative example of effects which may be produced in accordance with the invention. It will be understood that flooring or coverings for other surfaces may be laid as continuous layers extending over any desired extent of surface, and that the coverings may also be produced in slabs or tiles of any desired size and shape to be transported and laid on a previously prepared surface.

Figure 2:
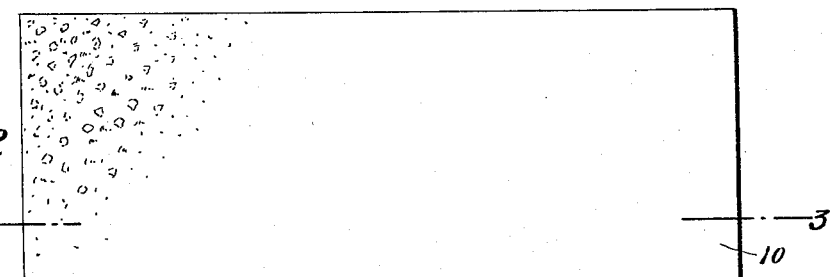
Figs. 2, 4, 6, 8 and 10 are plan views, and Figs. 3, 5, 7, 9 and 11 sectional views, illustrating successive steps in the making of a floor covering, or other covering or surfacing layer, in accordance with my invention.
Figure 3:
Figure 4:
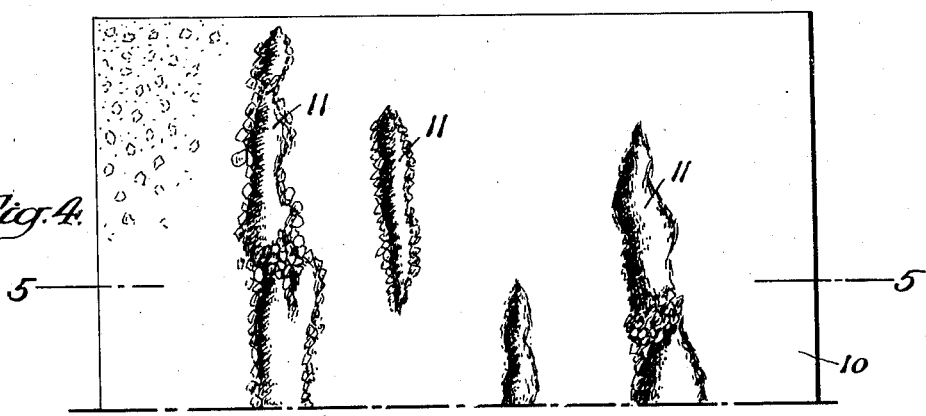
Figure 5:
Figure 6:
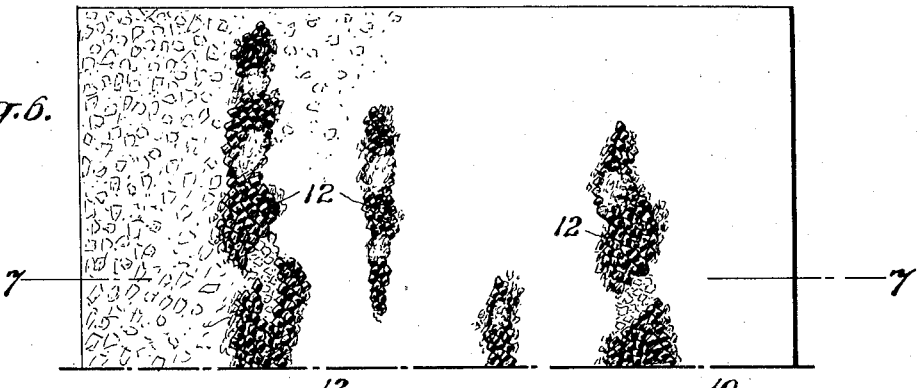
Figure 7:
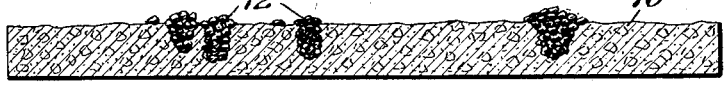
Figure 8:
Figure 9:
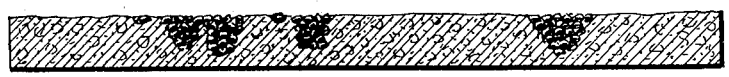
Figure 10:
Figure 11:
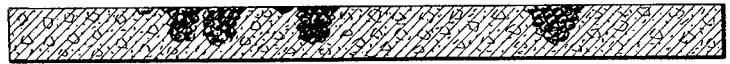

The first step in producing a covering according to the invention is to spread a plastic concrete mixture of cement and an aggregate of small stone pieces on a suitably prepared foundation in the usual manner of laying terrazzo flooring, the material being spread and leveled off or rough-smoothed by the usual trowelling, tamping or rolling. Figs. 2 and 3 show a part of such a body layer. While the body layer 10 is still plastic, a plastic mixture of cement and small stone pieces which is of a different, or contrasting, color, or which differs otherwise in appearance from the body layer mixture, is laid on portions of the body layer in distributed lines or areas according to the decorative result to be produced, that is, according to a desired plan or design. For producing a covering which will retain approximately its original decorative appearance after greater wearing away of its surface it is desirable before applying the mixture of contrasting appearance, which may be called the pattern mixture, to gouge or otherwise form openings in the body layer for receiving the pattern mixture. Such openings, as shown at 11 in Figs. 4 and 5, may for producing an effect such as illustrated by Fig. 1, be in the form of more or less irregular channels having a generally parallel relation and being of varying length, width and depth. Such channels or other openings should be formed in the body layer while it is still plastic, but after the material has reached a certain stage in its set so that the channels or openings will hold their form for a sufficient length of time, most desirably somewhat before what is generally recognized as the "initial set". The openings in the body layer are then filled with the plastic pattern material 12 as shown by Figs. 6 and 7. After the pattern material has been placed on the body layer, and while the body layer is still in a plastic state, the surface is again tamped or rolled to press the pattern material into and to consolidate it with the material of the body layer, as illustrated by Figs. 8 and 9, and then before "final set" and while the mass is still somewhat plastic, the surface may be finally trowelled to close all surface holes or depressions. The material is then allowed to harden, and after it is sufficiently hardened it is brought to a smooth even surface and the stone chips exposed by hand or machine grinding in the usual manner of finishing terrazzo flooring. Figs. 10 and 11 illustrate the finished product.

By the operation of pressing the pattern material into the body layer the applied masses of pattern material are caused to spread more or less irregularly, and the stone pieces along the edges of the areas of pattern material are caused to intermingle with stones along the edges of the adjoining areas or portions of the body layer, making the outline of the areas of pattern material more or less indefinite and not distinctly marked, having a soft, rather than a hard, sharply defined, outline. Individual stone particles of the pattern material may also in the operation of tamping or rolling be removed more or less from the pattern areas and set in the surface of the body layer at varying distances therefrom. In gouging the body layer to form openings to receive the pattern material, the material of the body layer will be thrown up more or less irregularly along the edges of the channels or other openings formed. The material thus thrown up may be smoothed off from the edges of the channels as shown at the right in Figs. 4 and 5 before the pattern material is placed in the channels. It is usually more desirable, however, not to smooth off such thrown-up material, but to leave it as shown at the left in Figs. 4 and 5, as the presence of such material along the edges of the channels has the effect of causing a more pronounced irregularity and indefiniteness of the outline of the pattern areas in the completed covering resulting from intermingling of stone pieces of the body material and the pattern material along the edges of the pattern areas. The gouging may be done with any suitable hand tool.

It will be understood that the term "color" is used herein in a broad sense, so that the expressions "of contrasting color" or "of different color" are to be taken as implying a difference in shade or tone as well as a difference in actual color in the more limited meaning of the word. The contrasting appearance of the pattern mixture may be obtained by having the stones of such mixture of different color, size or shape from the stones of the mixture used for the body layer, or the cement or both the cement and stone pieces may differ in color from those of the body layer, and in either mixture the stone pieces and the cement may be of the same color or of different colors. A quite pronounced difference in appearance may be obtained also by differently proportioning the cement and the stone aggregate in the two mixtures. Also, a plurality of different pattern mixtures may be used together to produce a desired decorative effect.

Obviously, a great variety of decorative effects or designs may be produced by my invention. While it is characteristic of the invention that the designs or effects produced are more or less irregular, yet they are not obtained in a haphazard fashion but are definitely controlled in approximate size, shape and arrangement, or design, of the lines or areas of contrasting color produced. It will be noted also that the design is not a mere surface design liable to be soon worn off from a surface such as a floor covering, but that even when no openings are formed in the body layer to receive the pattern material, but the pattern material is merely placed on the surface of the still plastic body layer and then pressed in, the design is formed by a body of material of substantial thickness which is an integral part of the surfacing layer or covering. It will be noted also that the absence of sharply defined, hard border lines in the design is caused by the interaction and intermingling of the stone particles or pieces of the materials forming adjoining portions of the layer.

What I claim is:

1. The method of making surface coverings of plastic material, which comprises spreading a body layer of a plastic mixture of cementitious material and an aggregate of small stone pieces, placing a plastic mixture of contrasting appearance also formed of cementitious material and small stone pieces on portions of the body layer in distributed lines or areas according to a desired plan or design, pressing the last applied mixture into the body layer while both it and the body layer are still plastic to consolidate it with the body layer, allowing the mass to harden, and grinding the surface smooth.

2. The method of making surface coverings of plastic material, which comprises spreading a body layer of a plastic mixture of cementitious material and an aggregate of small stone pieces, placing a plastic mixture of cementitious material and small stone pieces which are of contrasting color on portions of the body layer in distributed lines or areas according to a desired plan or design, pressing the last applied mixture into the body layer while both it and the body layer are still plastic to consolidate it with the body layer, allowing the mass to harden, and grinding the surface smooth.

3. The method of making surface coverings of plastic material, which comprises spreading a body layer of a plastic mixture of cementitious material and an aggregate of small stone pieces, forming openings in the body layer according to a desired plan or design, placing a plastic mixture of cementitious material and small stone pieces and of contrasting appearance in said openings, pressing the last applied mixture into the body layer while both it and the body layer are still plastic to consolidate it with the body layer, allowing the mass to harden, and grinding the surface smooth.

4. The method of making surface coverings of plastic material, which comprises spreading a body layer of a plastic mixture of cementitious material containing an aggregate of small stone pieces, allowing the body layer to partially set, gouging openings in the body layer according to a desired plan or design, placing a plastic mixture of cementitious material and small stone pieces and of contrasting appearance in said openings, pressing the last applied mixture into the body layer while both it and the body layer are still plastic to consolidate it with the body layer, allowing the mass to harden, and grinding the surface smooth.

5. A surface covering formed of plastic material, comprising a body layer of cementitious material containing an aggregate of small stone pieces and having a smoothed surface with distributed areas of contrasting appearance and of varying size and shape arranged to produce a decorative effect formed by a mixture of cement and small stone pieces pressed into the body layer and forming therewith an integral mass, such areas of contrasting appearance being more or less indefinite and irregular in outline due to intermingling of small stone pieces of adjoining surface areas.

In testimony whereof I have hereunto set my hand.

ROBERT W. PAGE.